United States Patent
Zhao et al.

(10) Patent No.: US 11,533,722 B2
(45) Date of Patent: Dec. 20, 2022

(54) METHOD FOR TRANSMITTING SIDELINK DATA AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/463,214

(22) Filed: Aug. 31, 2021

(65) Prior Publication Data
US 2021/0400665 A1 Dec. 23, 2021

Related U.S. Application Data

(63) Continuation of application No. PCT/CN2019/087273, filed on May 16, 2019.

(30) Foreign Application Priority Data

Mar. 1, 2019 (WO) ................ PCT/CN2019/076735

(51) Int. Cl.
*H04J 3/00* (2006.01)
*H04W 72/04* (2009.01)
*H04W 72/10* (2009.01)

(52) U.S. Cl.
CPC ....... *H04W 72/0446* (2013.01); *H04W 72/10* (2013.01)

(58) Field of Classification Search
CPC .......................... H04W 72/0446; H04W 72/10
See application file for complete search history.

(56) References Cited

U.S. PATENT DOCUMENTS

2017/0367087 A1* 12/2017 Seo ........................ H04W 72/10
2019/0014563 A1* 1/2019 Lee ...................... H04W 72/042
(Continued)

FOREIGN PATENT DOCUMENTS

CN        107079530 A     8/2017
CN        108322414 A     7/2018
(Continued)

OTHER PUBLICATIONS

International Search Report issued in corresponding International Application No. PCT/CN2019/087273, dated Dec. 3, 2019, 32 pages.

(Continued)

*Primary Examiner* — Siren Wei
(74) *Attorney, Agent, or Firm* — Bayes PLLC

(57) ABSTRACT

Embodiments of the present disclosure relate to a method for transmitting sidelink data, a terminal device and a non-transitory computer-readable storage medium. The method includes obtaining, by a terminal device, first configuration information; and obtaining, by the terminal device, second configuration information. The first configuration information is used to indicate to transmit a first sidelink transmission channel on a target transmission resource. The second configuration information is used to transmit a second sidelink transmission channel on the target transmission resource. The method further includes sending, by the terminal device, the first sidelink transmission channel or the second sidelink transmission channel on the target transmission resource according to a preset rule.

14 Claims, 4 Drawing Sheets

(56) References Cited

U.S. PATENT DOCUMENTS

| | | | | |
|---|---|---|---|---|
| 2020/0120458 A1* | 4/2020 | Aldana | ................ | H04W 4/08 |
| 2020/0196255 A1* | 6/2020 | Cheng | ................ | H04W 72/10 |
| 2020/0205165 A1* | 6/2020 | Huang | ................ | H04L 5/0051 |

FOREIGN PATENT DOCUMENTS

| | | | | |
|---|---|---|---|---|
| CN | 108811151 | A | | 11/2018 |
| CN | 109219024 | A | | 1/2019 |
| CN | 109314841 | A | | 2/2019 |
| EP | 3051736 | A1 | | 8/2016 |
| EP | 3131352 | A1 | | 2/2017 |
| EP | 3273634 | A1 | | 1/2018 |
| EP | 3873153 | A1 | | 9/2021 |
| WO | 2018133720 | A1 | | 7/2018 |
| WO | 2018175528 | A1 | | 9/2018 |
| WO | WO-2020164056 | A1 * | 8/2020 | ............... H04L 1/08 |

OTHER PUBLICATIONS

PCT Written Opinion of the International Searching Authority issued in corresponding International Application No. PCT/CN2019/087273, dated Dec. 3, 2019, 6 pages.

International Search Report issued in corresponding International Application No. PCT/CN2019/076735, dated Nov. 28, 2019, 30 pages.

PCT Written Opinion of the International Searching Authority issued in corresponding International Application No. PCT/CN2019/076735, dated Nov. 28, 2019, 9 pages.

"Discussion on coexistence of LTE sidelink and NR sidelink in NR V2X", Agenda Item: 7.2.4.5, Source: CATT, 3GPP TSG RAN WG1 Ad-Hoc Meeting 1901, R1-1900328, Taipei, Jan. 21-25, 2019, 7 pages.

"Discussion on UE-to-NW Relay Implementation Aspects", Agenda item: 7.2.3.2.1, Source: Intel Corporation, 3GPP TSG RAN WG1 Meeting #80bis, R1-151442, Belgrade, Serbia, Apr. 20-24, 2015, 9 pages.

"Discussion on resource allocation conflict for sidelink one-to-one communication", Agenda item: 7.5.1, Source: Spreadtrum Communications, 3GPP TSG-RAN WG2 Meeting #94, R2-163408, Nanjing, May 23-27, 2016, 5 pages.

Extended European Search Report issued in corresponding European Application No. 19917946.6, dated Feb. 23, 2022, 12 pages.

First Office action issued in corresponding India Application No. 202127042592, dated Mar. 11, 2022, 6 pages.

CNIPA Patent Priority Review issued in corresponding Chinese application No. 202111076411 5, dated Aug. 26, 2022.

First Office Action issued in corresponding Chinese application No. 202111076411.5, dated Sep. 20, 2022.

* cited by examiner

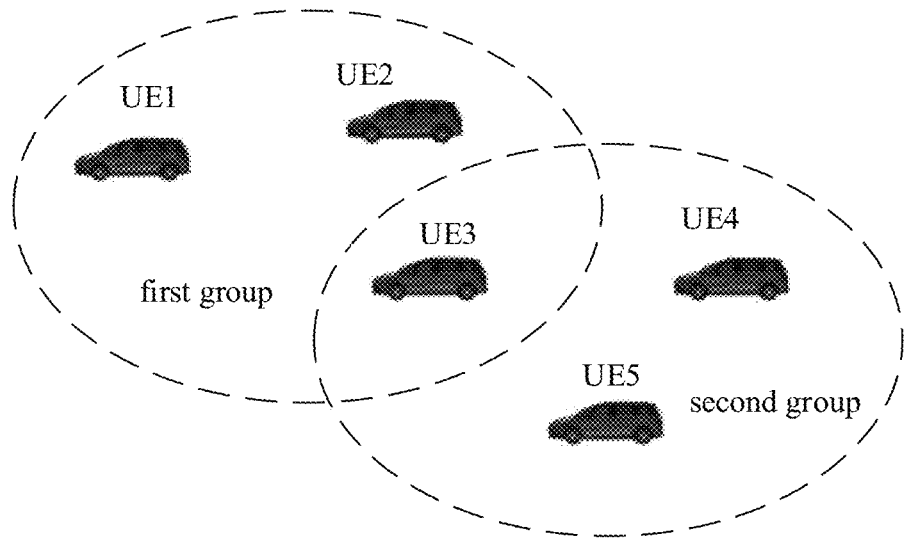

In a case where a terminal device determines to send a first sidelink transmission channel on a target transmission resource according to first configuration information, and determines to send a second sidelink transmission channel on the target transmission resource according to second configuration information, send, by the terminal device, the first sidelink transmission channel or the second sidelink transmission channel on the target transmission resource according to a preset rule ~S210

FIG. 4

METHOD FOR TRANSMITTING SIDELINK DATA AND TERMINAL DEVICE

CROSS-REFERENCE TO RELATED APPLICATION

This application is a continuation of International Application No. PCT/CN2019/087273, filed on May 16, 2019, which claims priority of International Application No. PCT/CN2019/076735 filed on Mar. 1, 2019, the entire contents of which are incorporated herein by reference.

BACKGROUND

Embodiments of the present disclosure generally relate to communication technologies, and more particularly, to a sidelink data transmission method, and a terminal device.

The Internet of Vehicles system is a kind of Sidelink (SL) transmission technology based on Long Term Evolution (LTE) Device to Device (D2D) communication. Unlike the traditional LTE system in which communication data is received or sent by a base station, the Internet of Vehicles system adopts the D2D direct communication, and thus has higher spectrum efficiency and lower transmission delay.

In the Vehicle to everything (V2X) technology of the NR system, there may be multiple transmission methods, such as unicast transmission, groupcast transmission, and broadcast transmission. In the unicast transmission, the receiving end has only one specific terminal device. In the groupcast transmission, a communication group is established; when a terminal device in the group sends data, for example, when a head terminal device in the group which has functions such as resource coordination, management, allocation and control, the other terminal devices in the group are receiving terminals. The unicast transmission can be regarded as a special groupcast transmission, that is, there are only two terminal devices in the group. In the broadcast transmission, one terminal device sends data, and the other terminal devices are all receiving terminals.

A terminal device can participate in multiple groupcast communications or broadcast communications. If the terminal device needs to send first sidelink data at a certain moment in a groupcast communication, but the terminal device needs to send second sidelink data at this moment in another groupcast communication or broadcast communication, then a conflict will occur.

SUMMARY

Embodiments of the present disclosure provide a sidelink data transmission method and a terminal device, which can solve the problem of the conflict in transmissions of sidelink transmission channels performed by the terminal device.

According to a first aspect, there is provided a sidelink data transmission method, including in a case where a terminal device determines to send a first sidelink transmission channel on a target transmission resource according to first configuration information, and determines to send a second sidelink transmission channel on the target transmission resource according to second configuration information, sending, by the terminal device, the first sidelink transmission channel or the second sidelink transmission channel on the target transmission resource according to a preset rule.

According to a second aspect, there is provided a terminal device configured to perform the method according to the first aspect or any implementation of the first aspect. Specifically, the terminal device includes functional modules configured to perform the method according to the first aspect or any implementation of the first aspect.

According to a third aspect, there is provided a terminal device including a processor and a memory configured to store a computer program, wherein the processor is used to call and run the computer program stored in the memory to perform the method according to the first aspect or any implementation of the first aspect.

According to a fourth aspect, there is provided a chip configured to perform the method according to any one of the first to second aspects or any implementation of the first to second aspects. Specifically, the chip includes a processor configured to call and run a computer program stored in a memory to cause a device in which the chip is installed to perform the method according to the first aspect or any implementation of the first aspect.

According to a fifth aspect, there is provided a computer program product including computer program instructions that cause a computer to perform the method according to the first aspect or any implementation of the first aspect.

In the above technical solutions, for the situation where the terminal device needs to send both the first sidelink channel and the second sidelink channel on a certain time domain resource, the terminal device can determine to send the first sidelink channel or the second sidelink channel according to the service attribute of the data to be sent, or transmission modes, or resource allocation modes, or channel types. Thus, the technical solutions can avoid sidelink transmission conflicts and improve the transmission efficiency of the system.

BRIEF DESCRIPTION OF THE DRAWINGS

FIG. 3 is a schematic diagram of a groupcast communication where a terminal device is according to an embodiment of the present disclosure.

FIG. 4 is a schematic flowchart of a sidelink data transmission method according to an embodiment of the present disclosure.

DETAILED DESCRIPTION

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

Embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system or a 5G system, and so on.

Figure 1:
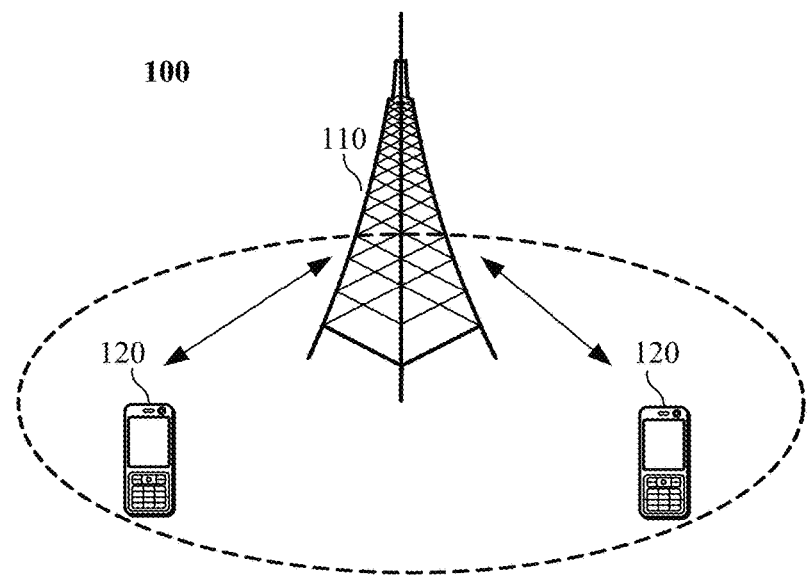
FIG. 1 is a schematic diagram of a communication system architecture according to an embodiment of the present disclosure.

As an example, the communication system 100 in which embodiments of the present disclosure are applied may be as shown in FIG. 1. The communication system 100 includes a network device 110, and the network device 110 may be a device that communicates with a terminal device 120 (or called a communication terminal or a terminal). The network device 110 can provide communication coverage for a specific geographic area, and can communicate with terminal devices in the coverage area. According to embodiments, the network device 110 may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 100 also includes at least one terminal device 120 within the coverage area of the network device 110. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM broadcast transmitter; and/or the terminal device is connected via a device of another terminal device which is configured to receive/send communication signals; and/or the terminal device is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc.

According to some embodiments, the direct Device to Device (D2D) communication may be performed between the terminal devices 120.

According to some embodiments, the 5G system or 5G network may also be referred to as a New Radio (NR) system or NR network.

FIG. 1 exemplarily shows one network device and two terminal devices. According to other embodiments, the communication system 100 may include multiple network devices and the coverage of each network device may include other numbers of terminal devices, and embodiments of the present disclosure do not impose specific limitations on this.

According to some embodiments, the communication system 100 may further include other network entities such as a network controller or a mobility management entity, and embodiments of the present disclosure do not impose specific limitations on this.

It should be understood that a device with a communication function in the network/system in embodiments of the present disclosure may be referred to as a communication device. Taking the communication system 100 shown in FIG. 1 as an example, the communication device may include the network device 110 and the terminal devices 120 having a communication function. The network device 110 and the terminal devices 120 may be the specific devices described above, and repeated descriptions will be omitted here. The communication device may also include other devices in the communication system 100, such as a network controller, a mobility management entity, or other network entities, and embodiments of the present disclosure do not impose specific limitations on this.

It should be understood that the terms "system" and "network" are often used interchangeably herein. It should be noted that the term "and/or" herein is only an association relationship describing associated objects, which means that there can be three relationships, for example, A and/or B can mean three situations: A alone, B alone, and A and B together. Further, the character "/" means that the associated objects before and after "/" are in an "or" relationship.

Figure 2:
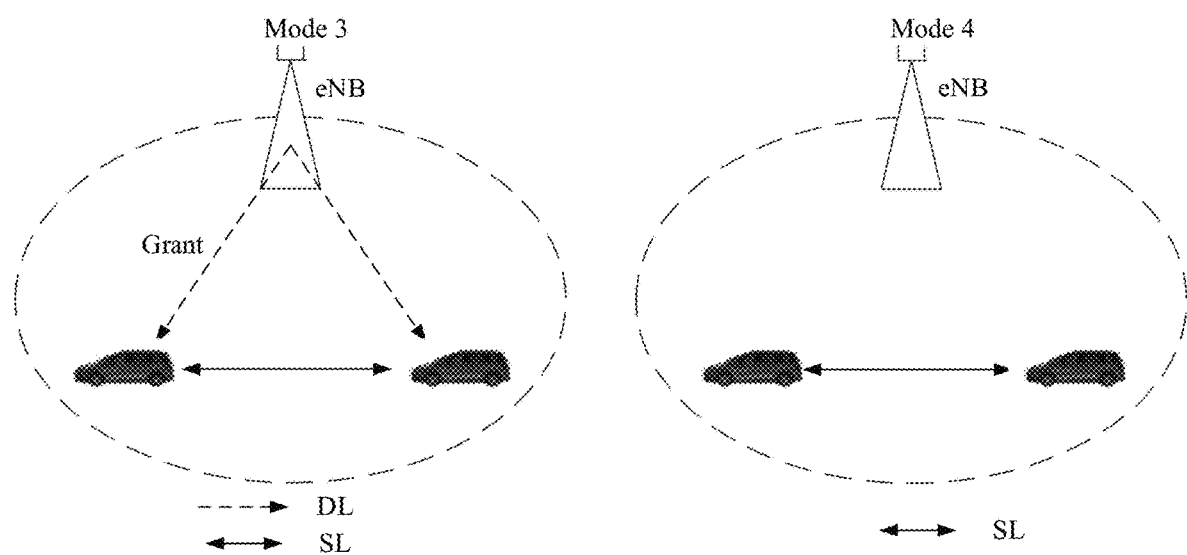
FIG. 2 is a schematic diagram of a sidelink system according to an embodiment of the present disclosure.

V2X is standardized in 3GPP Release 14 (Rel-14), and two transmission modes are defined: Mode 3 and Mode 4. FIG. 2 shows a schematic diagram of two transmission modes in the Internet of Vehicles system according to an embodiment of the present disclosure.

As shown in FIG. 2, the Mode 3 on the left indicates that the transmission resources for vehicle-mounted terminals are allocated by a base station through the downlink (DL), and the vehicle-mounted terminals transmit data on the SL according to the resources allocated by the base station. The base station can allocate resources for a single transmission to the vehicle-mounted terminals, or the base station can allocate semi-static transmission resources to the vehicle-mounted terminals.

As shown in FIG. 2, the Mode 4 on the right indicates that the vehicle-mounted terminals use a sensing+reservation transmission method to perform SL transmissions. The vehicle-mounted terminals obtain a set of available transmission resources in a resource pool by sensing, and the vehicle-mounted terminals randomly select a resource from the set for data transmission. Since the services in the Internet of Vehicles system have periodic characteristics, the vehicle-mounted terminals usually adopt a semi-static transmission method, that is, after the vehicle-mounted terminals select a transmission resource, vehicle-mounted terminals will continue to use the resource in multiple transmission cycles, thereby reducing resource reselection and the probability of resource conflicts. The vehicle-mounted terminals carry information to reserve the resource for the next transmission in control information of the current transmission, so that other vehicle-mounted terminals can determine whether this resource is reserved and used by a user by detecting the control information of the user, so as to reduce resource conflicts.

In the NR-V2X system, similar to the above, multiple transmission modes are introduced. For example, the transmission modes can include Mode 1 and Mode 2. In Mode 1, a network device allocates transmission resources for terminals, which is similar to Mode 3 in LTE-V2X, and the terminal devices use the transmission resources allocated by the network device. In Mode 2, the terminal devices select the transmission resources. Mode 2 is further divided into several sub-modes which are described below.

1. Mode 2a: A terminal device autonomously selects transmission resources, similar to the aforementioned Mode 4 in LTE-V2X. For example, a terminal autonomously selects resources from a pre-configured or network-configured resource pool. The terminal can randomly select resources, or can select resources by sensing.

2. Mode 2b: A terminal assists other terminals in selecting resources. For example, a first terminal sends assistance information to a second terminal, and the terminal device that receives the assistance information can determine the transmission resources based on the assistance information. The assistance information may include one or more of the following information: available time-frequency resource information, available transmission resource set information, channel measurement information and channel quality information, such as Channel State Information (CSI), Channel Quality Indicator (CQI), Precoding Matrix Indicator (PMI), Rank Indication (RI), Reference Signal Received Power (RSRP), Reference Signal Received Quality (RSRQ), Reference Signal Strength Indicator (RSSI), interference information, and path loss information, etc.

3. Mode 2c: A terminal device selects a resource from transmission resources configured for the terminal device. For example, a network device can configure transmission resources for each terminal in a group of terminal devices. The transmission resources for the terminal devices can be the same or different. When any one of the terminals has sidelink data to be transmitted, the transmission resources configured by the network device can be used for data transmission. For example, when the network device configures the same resources for each terminal device in a group of terminal devices, a terminal which needs to perform sidelink data transmission can select an available resource from the configured resources by listening; or, the network device can configure different transmission resources for each terminal device in a group of terminal devices, and a terminal which needs to perform sidelink data transmission can select an available resource from the resources configured for the terminal.

4. Mode 2d: A first terminal device allocates transmission resources to a second terminal device. For example, for multiple terminal devices in a groupcast link, if the first terminal device is the group head of the group link, and the second terminal device is a member of the group, the first terminal device can directly allocate time-frequency resources for sidelink transmission to the second terminal device.

It should be understood that the foregoing descriptions of the transmission modes in LTE-V2X and NR-V2X are only exemplary descriptions, and actual systems may include all or part of the foregoing transmission modes, or include other transmission modes, which is not limited herein.

In addition, in NR V2X, there may be multiple transmission methods, such as unicast transmission, groupcast transmission, and broadcast transmission. In the unicast transmission, the receiving end has only one specific terminal device. In the groupcast transmission, a communication group is established; when a terminal device in the group sends data, for example, when a head terminal device in the group which has functions such as resource coordination, management, allocation and control, the other terminal devices in the group are target receiving terminals. The unicast transmission can be regarded as a special groupcast transmission, that is, there are only two terminal devices in the group. In the broadcast transmission, one terminal device sends data, and the other terminal devices are all target receiving terminals.

In the groupcast (or unicast) transmission, the group head can allocate transmission resources to group members. For example, terminal devices can use the above resource allocation method such as mode 2d, and one terminal device can participate in one or more groupcast communications. For example, taking FIG. 3 as an example, FIG. 3 is a schematic diagram of two groupcast transmissions according to an embodiment of the present disclosure. As shown in FIG. 3, it is assumed that UE1, UE2, and UE3 constitute a first communication group, and UE1 is the group head; meanwhile, UE3, UE4, and UE5 constitute a second communication group, and UE5 is the group head. UE3 is in two communication groups at the same time. In the first group, UE1 can allocate transmission resources for UE3, and in the second group, UE5 can allocate transmission resources for UE3. At a certain moment, UE1 may instruct UE3 to send first sidelink data at this moment, for example, UE1 may instruct UE3 to send a first Physical Sidelink Shared Channel (PSSCH), but UE5 may instruct UE3 to send second sidelink data at this moment, for example, UE5 may instruct UE3 to send a second PSSCH, how does UE3 handle the situation.

Or, UE3 performs groupcast transmission in the first group, and UE3 also needs to perform broadcast transmission. In the groupcast transmission, UE1 allocates transmission resources for UE3. In broadcast transmission, UE3 autonomously selects transmission resources, such as using Mode 2a. At a certain moment, UE1 instructs UE3 to send the first sidelink data, for example, UE1 instructs UE3 to send the first PSSCH, but UE3 chooses this time moment to send the second sidelink data, for example, to send the second PSSCH, how does UE3 handle the situation.

In view of the above, embodiments of the present disclosure propose a method for transmitting sidelink data, which can solve the conflict that occurs when a terminal device needs to send multiple pieces of sidelink data at a certain moment.

FIG. 4 shows a schematic flowchart of a sidelink data transmission method 200 according to an embodiment of the present disclosure. The method 200 may be performed by any terminal device. Specifically, the terminal device may perform sidelink communications with other terminal devices. For example, the terminal device may be any terminal device shown in FIG. 1, FIG. 2 or FIG. 3. As shown in FIG. 4, the method 200 includes the followings.

In S210, in a case where the terminal device determines to send a first sidelink transmission channel on a target transmission resource according to first configuration information, and determines to send a second sidelink transmission channel on the target transmission resource according to second configuration information, the terminal device sends the first sidelink transmission channel or the second sidelink transmission channel on the target transmission resource according to a preset rule.

It should be understood that before S210, the method 200 further includes: determining, by the terminal device, to send the first sidelink transmission channel on the target transmission resource according to the first configuration information. In addition, the method 200 may further include: determining, by the terminal device, to send the second sidelink transmission channel on the target transmission resource according to the second configuration information. That is, on the same target transmission resource, both the first sidelink transmission channel and the second sidelink transmission channel on the sidelink are configured to be sent, and thus resource conflicts will occur.

In embodiments of the present disclosure, the first sidelink transmission channel and the second sidelink transmission channel refer to sidelink communications between the terminal device and other terminal devices. Specifically, sending the first sidelink transmission channel on the target transmission resource by the terminal device may include: sending, by the terminal device, data to a first terminal device through the first sidelink transmission channel using the target transmission resource. Sending the second sidelink transmission channel on the target transmission resource by the terminal device may include: sending, by the terminal device, data to a second terminal device through the second sidelink transmission channel using the target transmission resource. The first terminal device and the second terminal device both refer to any terminal device, and the first terminal device and the second terminal device may refer to the same terminal device, or may refer to different terminal devices.

According to some embodiments, the first sidelink transmission channel or the second sidelink transmission channel may be any one of the following channels: Physical Sidelink Control Channel (PSCCH), PSSCH, Physical Sidelink Broadcast Channel (PSBCH) and Physical Sidelink Feedback Channel (PSFCH).

According to some embodiments, the method 200 of the present disclosure is applicable to the sidelink transmission channel, and is also applicable to the transmission of sidelink signals. For example, the first sidelink transmission channel or the second sidelink transmission channel may also refer to a signal in the sidelink. For example, the first sidelink transmission channel or the second sidelink transmission channel may also refer to a Sidelink Synchronization Signal (SLSS), a Demodulation Reference Signal (DMRS), a Channel State Information Reference Signal (CSI-RS), or a Phase Tracking Reference Signal (PT-RS). The SLSS may include a Sidelink-Primary Synchronization Signal (S-PSS) and/or a Sidelink-Secondary Synchronization Signal (S-SSS), and embodiments of the present disclosure do not impose specific limitations on this.

It should be understood that the first configuration information and/or the second configuration information may be configuration information sent by a network device, such as scheduling information from the network device. Or, the first configuration information and/or the second configuration information may be indication information sent from another terminal device. For example, the first configuration information may be sent by another terminal device through sidelink control information (SCI) or higher layer indication information to instruct the terminal to send the first sidelink channel on the target transmission resource. Or, the determination of the target transmission resource according to the first configuration information and/or the second configuration information refers to: the terminal device selecting the target transmission resource according to assistance information sent by another terminal device, and determining to send the first sidelink transmission channel on the target transmission resource or determining to send the second sidelink transmission channel on the target transmission resource. Or, the first configuration information and/or the second configuration information may be resource selection or scheduling information from the upper layer of the terminal device.

It should be understood that the target transmission resource in embodiments of the present disclosure may be a time domain resource, or may be a time-frequency resource. Specifically, if the target transmission resource is a time domain resource, the terminal device determines, according to the first configuration information, to use the time domain resource to send the first sidelink transmission channel and also send the second sidelink transmission channel at the same time, and the frequency domain resources corresponding to the first sidelink transmission channel and the second sidelink transmission channel may be the same or different.

In embodiments of the present disclosure, when the terminal device determines that the first sidelink transmission channel and the second sidelink transmission channel need to be sent on the same target transmission resource according to the first configuration information and the second configuration information, the terminal device can follow a preset rule to choose to send the first sidelink transmission channel or to choose to send the second sidelink transmission channel on the target transmission resource. The preset rule may be pre-configured, for example, the preset rule may be stipulated by a protocol; or, the preset rule may be configured by the network device for the terminal device, and embodiments of the present disclosure do not impose specific limitations on this.

It should be understood that the preset rule may include a variety of implementations. The following will give examples of the preset rule in detail.

First Embodiment is described below.

The preset rule includes, according to a comparison result between first parameter information of first data to be sent on the first sidelink transmission channel and second parameter information of second data to be sent on the second sidelink transmission channel, sending, by the terminal device, the first sidelink transmission channel or the second sidelink transmission channel on the target transmission resource.

Specifically, before S210, the method 200 may further include the following steps: the terminal device may obtain the first parameter information of the first data to be sent, and may also obtain the second parameter information of the second data to be sent. The first parameter information and/or the second parameter information may be predefined by a protocol, or determined by the terminal device, or configured by the network device, or configured by another terminal device, and embodiments of the present disclosure do not impose specific limitations on this.

How the terminal device chooses to send the first sidelink transmission channel or the second sidelink transmission channel on the target transmission resource according to the comparison result between the first parameter information and the second parameter information may be related to specific parameters included in the first parameter information and the second parameter information.

According to an embodiment, the first parameter information may be priority information of the first data to be sent, and correspondingly, the second parameter information is priority information of the second data to be sent. Accordingly, the terminal device may choose to send the sidelink transmission channel with a higher priority on the target transmission resource according to a comparison result of the priorities. Specifically, if the priority of the first data to be sent is higher than the priority of the second data to be sent, the terminal device sends the first sidelink transmission channel on the target transmission resource.

According to some embodiments, the priority information of the first data to be sent and/or the second data to be sent may be carried in Sidelink Control Information (SCI). For example, a ProSe Per-Packet Priority (PPPP) value may be used to indicate the priority. Generally, the lower the PPPP value is, the higher the priority will be, but the embodiments of the present disclosure are not limited to this.

For example, the PPPP value of the data to be sent on the first sidelink transmission channel is 1, and the PPPP value of the data to be sent on the second sidelink transmission channel is 3. It is assumed that the lower the PPPP value is, the higher the priority will be. Thus, the priority of the first data to be sent is higher than the priority of the second data to be sent, and the terminal device sends the first sidelink transmission channel on the target transmission resource.

According to another embodiment, the first parameter information may be the latency information of the first data to be sent, and correspondingly, the second parameter information is the latency information of the second data to be sent. Accordingly, the terminal device may compare the latencies according to the latency requirements of the first data to be sent and the second data to be sent, and then select a sidelink transmission channel with a smaller transmission latency to be transmitted on the target transmission resource. Specifically, if the latency of the first data to be sent is smaller than the latency of the second data to be sent, the terminal device sends the first sidelink transmission channel on the target transmission resource.

It should be understood that the above-mentioned latency information may be information indicating the latency requirement of data. For example, generally speaking, the smaller the latency is, the higher the latency requirement will be.

For example, the latency requirement of the first data to be sent on the first sidelink transmission channel is 10 ms, the latency requirement of the second data to be sent on the second sidelink transmission channel is 100 ms, and the latency requirement of the first data to be sent is lower than the latency requirement of the second data to be sent. A lower latency requirement usually means a more urgent service. Therefore, the terminal device can choose to send the first sidelink transmission channel on the target transmission resource.

According to another embodiment, the first parameter information may be reliability information of the first data to be sent, and correspondingly, the second parameter information may be reliability information of the second data to be sent. Accordingly, the terminal device can compare the reliability according to the reliability requirements of the first data to be sent and the second data to be sent, and then select a sidelink transmission channel with a higher reliability requirement to be transmitted on the target transmission resource. Specifically, if the reliability of the first data to be sent is greater than the reliability of the second data to be sent, the terminal device sends the first sidelink transmission channel on the target transmission resource.

For example, the reliability requirement of the first data to be sent on the first sidelink transmission channel is 90%, the reliability requirement of the second data to be sent on the second sidelink transmission channel is 99%, and the reliability requirement of the first data to be sent is lower than the reliability requirement of the second data to be sent, and thus the terminal device sends the second sidelink transmission channel on the target transmission resource.

According to another embodiment, the first parameter information may be the type of the first data to be sent, and correspondingly, the second parameter information is the type of the second data to be sent. Accordingly, the terminal device may choose to send the first sidelink transmission channel or the second sidelink transmission channel on the target transmission resource according to the different types of the first data to be sent and the second data to be sent. Specifically, the type of the first data to be sent may be one of the following types: control information, data, feedback information, broadcast information, and measurement information. Similarly, the type of the second data to be sent may be one of the following types: control information, data, feedback information, broadcast information, and measurement information.

The feedback information may specifically include data state feedback information and/or channel feedback information. For example, the data state feedback information may be sidelink Hybrid Automatic Repeat reQuest (HARD) acknowledgement/non-acknowledgement (ACK or NACK) information; the channel feedback information may be sidelink CSI, sidelink CQI, sidelink PMI or sidelink RI.

The measurement information may specifically include at least one of the following: sidelink RSRP, sidelink RSRQ, sidelink RSSI, and sidelink path loss information.

The data may specifically include the initial transmission data and retransmission data. The retransmission data may refer to any other retransmission data except the initial transmission.

Correspondingly, for different types of the first data to be sent and the second data to be sent, the preset rule may include at least one of the following rules: the feedback information takes precedence over the control information and the data for transmission; the feedback information takes precedence over the measurement information for transmission; the feedback information takes precedence over the broadcast information for transmission; the broadcast information takes precedence over the control information and the data for transmission; the control information and the data takes precedence over the measurement information for transmission; the control information takes precedence over the data for transmission; the data feedback information takes precedence over the channel feedback information for transmission; or transmission of the initial transmission data takes precedence over the transmission of the retransmission data.

For example, if the first data to be sent is the feedback information, and the second data to be sent is the control information or data, the terminal device sends the first sidelink transmission channel on the target transmission resource. That is to say, the priority of feedback information can be set as higher than the priority of the control information or data.

For another example, if the first data to be sent is the feedback information, and the second data to be sent is the control information or data, it may be further determined to send the first sidelink transmission channel or the second sidelink transmission channel on the target transmission resource according to the priorities. Specifically, it is assumed that the first data to be sent is first feedback information for the first sidelink data, for example, the first feedback information can be sent through PSFCH, and the corresponding first parameter information is the priority information of the first sidelink data; the second data to be sent is second sidelink data, for example, the second sidelink data is sent through PSSCH, and the second parameter information is the priority information of the second data. The preset rule includes: if the priority of the first sidelink data is higher than the priority of the second sidelink data, the terminal device sends the first sidelink transmission channel on the target transmission resource; or, if the priority of the first sidelink data is lower than the priority of the second sidelink data, the terminal device sends the second sidelink transmission channel on the target transmission resource.

The priority information of the first sidelink data can be carried by the SCI. For example, the terminal device receives the first sidelink data sent by another terminal device, and the SCI used for scheduling the first sidelink data sent by the another terminal device may include priority information of the first sidelink data.

For another example, if the first data to be sent is the feedback information and the second data to be sent is the measurement information, the terminal device sends the first sidelink transmission channel on the target transmission resource.

For another example, if the first data to be sent is the feedback information and the second data to be sent is the broadcast information, the terminal device sends the first sidelink transmission channel on the target transmission resource.

For another example, if the first data to be sent is the broadcast information, and the second data to be sent is the control information or the data, the terminal device sends the first sidelink transmission channel on the target transmission resource.

For another example, if the first data to be sent is the control information or the data, and the second data to be sent is the measurement information, the terminal device sends the first sidelink transmission channel on the target transmission resource.

For another example, if the first data to be sent is the control information and the second data to be sent is the data, the terminal device sends the first sidelink transmission channel on the target transmission resource.

For another example, if the first data to be sent is the data feedback information, and the second data to be sent is the channel feedback information, the terminal device sends the first sidelink transmission channel on the target transmission resource.

For another example, if the first data to be sent is the initial transmission data and the second data to be sent is the retransmission data, for example, the second data to be sent is the data for the second transmission, the terminal device sends the first sidelink transmission channel on the target transmission resource.

Conversely, if the types of the first data to be sent and the second data to be sent are the same, further determinations can be made based on other information. For example, if the type of the first data to be sent and the type of the second data to be sent are the same and both are the feedback information, and the receiving end of the first data to be sent is the same as the receiving end of the second data to be sent, that is to say, the terminal device sends feedback information for two pieces of sidelink received data to a same terminal device, then the terminal device can send a sidelink transmission channel including the first data to be sent and the second data to be sent on the target transmission resource.

For another example, it is still assumed that the type of the first data to be sent and the type of the second data to be sent are the same and both are the feedback information. Specifically, it is assumed that the first data to be sent is feedback information for third sidelink data, and the second data to be sent is feedback information for fourth sidelink data. The receiving ends of the two pieces of feedback information can be the same or different, that is to say, the terminal device can send the feedback information for the two pieces of sidelink received data to the same terminal device, or send the feedback information for the two pieces of sidelink received data to different terminal devices. Under such condition, the terminal device may compare the parameter information of the third sidelink data with the parameter information of the fourth sidelink data to determine whether to send the first sidelink transmission channel or the second sidelink transmission channel on the target transmission resource.

That is, the first parameter information is the parameter information of the third sidelink data, the second parameter information is the parameter information of the fourth sidelink data, and the preset rule may include: according to a comparison result between the parameter information of the third sidelink data and the parameter information of the fourth sidelink data, sending, by the terminal device, the first sidelink transmission channel or the second sidelink transmission channel on the target transmission resource.

The parameter information of the third sidelink data may be at least one of the following information of the third sidelink data: priority information, reliability information, and latency information. Correspondingly, the parameter of the fourth sidelink data may be at least one of the following information of the fourth sidelink data: priority information, reliability information, and latency information. For example, it is assumed that the parameter information of the third sidelink data is the priority information of the third sidelink data, and the parameter information of the fourth sidelink data is the priority information of the fourth sidelink data. If the priority of the third sidelink data is higher than the priority of the fourth sidelink data, the terminal device sends the first sidelink transmission channel on the target transmission resource.

According to some embodiments, the parameter information of the third sidelink data can be carried in SCI used to schedule the third sidelink data, and the parameter information of the fourth sidelink data can be carried in SCI used to schedule the fourth sidelink data.

According to another embodiment, the first parameter information may be the service type of the first data to be sent, and correspondingly, the second parameter is the service type of the second data to be sent. Accordingly, according to different service types of the first data to be sent and the second data to be sent, the terminal device may select to send the first sidelink transmission channel or the second sidelink transmission channel on the target transmission resource. Specifically, the terminal device may choose to send the first sidelink transmission channel or the second sidelink transmission channel on the target transmission resource according to different logical channels and/or transmission configuration files corresponding to different service types of the first data to be sent and the second data to be sent.

For example, the preset rule may include: if the priority of the logical channel corresponding to the service type of the first data to be sent is higher than the priority of the logical channel corresponding to the service type of the second data to be sent, sending, by the terminal device, the first sidelink transmission channel on the target transmission resource.

For another example, the preset rule may further include: if the priority of the transmission configuration file corresponding to the service type of the first data to be sent is higher than the priority of the transmission configuration file corresponding to the service type of the second data to be sent, sending, by the terminal device, the first sidelink transmission channel on the target transmission resource.

According to some embodiments, the priorities between logical channels or the priorities between transmission configuration files may be pre-defined by a protocol, or may be configured by the network, or may be configured by another terminal device.

According to some embodiments, the first parameter information and the second parameter information may be other parameter information. For example, the first parameter information is at least one of the following information of the first data to be sent: minimum transmission distance information, minimum communication distance information, Quality of Service (QoS) information, QoS Class Indicator (QCI) information, 5G QoS indicator (5QI) and V2X 5QI (VQI). Correspondingly, the second parameter is at least one of the following information of the second data to be sent: minimum transmission distance information, minimum communication distance information, QoS information, QCI, 5QI, and VQI. Embodiments of the present disclosure do not impose specific limitations on this. For brevity, the present disclosure does not list all information.

For example, if the first parameter information is the minimum transmission distance information of the first data to be sent, and the second parameter information is the minimum transmission distance information of the second data to be sent, the terminal device can select to send a sidelink transmission channel with a smaller minimum transmission distance on the target transmission resource according to the minimum transmission distance information of the first data to be sent and the second data to be sent. For example, if the minimum transmission distance of the first data to be sent is greater than the minimum transmission distance of the second data to be sent, the terminal device transmits the first sidelink transmission channel on the target transmission resource.

For another example, if the first parameter information is the minimum communication distance information of the first data to be sent, and the second parameter information is the minimum communication distance information of the second data to be sent, the terminal device can select to send a sidelink transmission channel with a smaller minimum communication distance on the target transmission resource according to the minimum communication distance information of the first data to be sent and the second data to be sent. For example, if the minimum communication distance of the first data to be sent is greater than the minimum communication distance of the second data to be sent, the terminal device transmits the first sidelink transmission channel on the target transmission resource.

For another example, the first parameter information is QoS information, QCI, 5QI or VQI of the first data to be sent, and correspondingly, the second parameter information is QoS information, QCI, 5QI or VQI of the second data to be sent. These parameters can usually be represented by a value or a vector that includes multiple parameters. Therefore, the terminal device can select a sidelink transmission channel corresponding to data with a lower value on the target transmission resource according to the values of these parameters of the first data to be sent and the second data to be sent. For example, if the value of the QoS of the first data to be sent is lower than the value of the QoS of the second data to be sent, the terminal device sends the first sidelink transmission channel on the target transmission resource. For the sake of brevity, the present disclosure does not list all examples one by one.

In each of the foregoing embodiments, the first parameter information and the second parameter information each include one piece of information, but according to some other embodiments, the first parameter information and the second parameter information may also include multiple pieces of information, and comprehensive determination may be made based on multiple pieces of information. For example, the first parameter information and the second parameter information both include priority information and latency information. The priority can be compared first. If the priority in the first parameter information is not equal to the priority in the second parameter information, then the terminal device selects the first sidelink transmission channel or the second sidelink transmission channel to be sent on the target transmission resource according to the comparison result of the priorities as described above; if the priority in the first parameter information is the same as the priority in the second parameter information are equal, the terminal device can compare the latency information in the first parameter information with the latency information in the second parameter information, and according to the comparison result of the latency information, the terminal device can choose to send the first sidelink transmission channel or the second sidelink transmission channel on the target transmission resource.

Therefore, when the first parameter information and the second parameter information include multiple parameters, the parameters can be used in combination, and embodiments of the present disclosure do not impose specific limitations on this.

Second Embodiment is described below.

The preset rule includes, if a priority of a transmission type of the first sidelink transmission channel is higher than a priority of a transmission type of the second sidelink transmission channel, sending, by the terminal device, the first sidelink transmission channel on the target transmission resource.

In embodiments of the present disclosure, the transmission type of the first sidelink transmission channel or the second sidelink transmission channel can be unicast transmission, groupcast transmission, or broadcast transmission. The unicast transmission can also be regarded as a special groupcast transmission. For ease of description, the unicast transmission mentioned below refers to the sidelink communication between two terminal devices, and the groupcast transmission refers to the sidelink communication among three or more terminal devices.

In embodiments of the present disclosure, the priority of the transmission type of the sidelink transmission channel can be set according to actual applications, or according to protocol regulations, or configured by the network. For example, it is usually set that the priority of the unicast transmission and the groupcast transmission is higher than the priority of the broadcast transmission; and the priority of unicast transmission and the priority of groupcast transmission can be equal or unequal, or which of the priorities of the unicast transmission and the groupcast transmission is lower or higher can be determined according to other conditions; or, the priority of the unicast transmission can be set to be higher or lower than the priority of the groupcast transmission, but embodiments of the present disclosure are not limited to this.

Third Embodiment is described below.

The preset rule includes, sending, by the terminal device, the first sidelink transmission channel or the second sidelink transmission channel on the target transmission resource according to a method for determining the target transmission resource or a method for allocating the target transmission resource in the first configuration information and the second configuration information.

It should be understood that there may be multiple ways to determine the target transmission resource for the terminal device, such as the above-mentioned Mode 1 and Mode 2 in the NR-V2X system, and the Mode 2 may include multiple sub-modes such as Modes 2a to 2d. The method for determining the target transmission resource by the terminal device according to the first configuration information may be different from the method for determining the target transmission resource according to the second configuration information. Therefore, the terminal device may choose to send the first sidelink transmission channel or the second sidelink transmission channel on the target transmission resource according to the allocation method of the target transmission resource.

According to an embodiment, depending the entity which allocates the target transmission resource, the method for determining the target transmission resource can be divided into allocation by a network device, allocation by another terminal device, and autonomous selection by the terminal device. Therefore, the allocation method of the target transmission resource in the first configuration information or the second configuration information may be any one of the following methods: allocation by a network device, allocation by another terminal device, and autonomous selection by the terminal device.

Specifically, the allocation method of the target transmission resource in the first configuration information or the second configuration information is allocation by a network device means that: the target transmission resource is determined according to configuration information from the network device. Specifically, the network device sends the first configuration information or the second configuration information to the terminal device, and the first configuration information or the second configuration information may be scheduling information or resource pool configuration information sent by the network device. That is, the network device allocates the target transmission resource to the terminal device through the first configuration information for sending the first sidelink transmission channel, or the network device allocates the target transmission resource to the terminal device through the second configuration information for sending the second sidelink transmission channel.

Similarly, the allocation method of the target transmission resource in the first configuration information or the second configuration information is allocation by another terminal device means that: the target transmission resource is determined according to indication information from another terminal device. Specifically, another terminal device sends the first configuration information or the second configuration information to the terminal device. The another terminal device may be a terminal device different from the terminal device, and may refer to any one terminal device other than the terminal device. That is, the another terminal device allocates the target transmission resource to the terminal device through the first configuration information for sending the first sidelink transmission channel, or the another terminal device allocates the target transmission resource to the terminal device through the second configuration information for sending the second sidelink transmission channel.

The allocation method of the target transmission resource in the first configuration information or the second configuration information is autonomous selection by the terminal device means that: the target transmission resource is autonomously selected by the terminal device. For example, the first configuration information or the second configuration information may be determined by the terminal device itself. That is, the terminal device determines the first configuration information and determines to use the target transmission resource to send the first sidelink transmission channel; or, the terminal device determines the second configuration information, and determines to use the target transmission resource to send the second sidelink transmission channel. The first configuration information or the second configuration information can come from a higher layer of the terminal device, such as an application layer, or a radio link control layer, or a media access control layer.

It should be understood that different resource allocation methods can correspond to different priorities. For example, it can be generally set that the resource allocation method in which a network device allocates resources has the highest priority, that is, if the target transmission resource is determined according to the configuration information from the network device, the resource allocation method has the highest priority. For example, the priority of the above Mode 1 is greater than the priority of the Mode 2. Assuming that the terminal device adopts Mode 1, it is determined according to the first configuration information to send the first sidelink transmission channel on the target transmission resource; if Mode 2 is adopted (any of the above Modes 2, for example, Mode 2a in Mode 2), it is determined to send the second sidelink transmission channel on the target transmission resource according to the second configuration information. Since the priority of Mode 1 is greater than the priority of Mode 2, the terminal device selects to send the first sidelink transmission channel on the target transmission resource.

In addition, the priority of the allocation by another terminal device and the priority of autonomous selection by the terminal device can be the same or different. That is, the priority of the method in which the target transmission resource is determined according to the indication information from another terminal device and the priority of the method in which the terminal autonomously selects the resources can be the same or can be different. For example, the priority of the resource allocation method in which another terminal device allocates resources can be set as higher than the priority of the resource allocation method in which the terminal device itself allocates resources. For example, the priority of the aforementioned Mode 2d or Mode 2b is greater than the priority of Mode 2a, but embodiments of the present disclosure are not limited to this.

For example, if the target transmission resource in the first configuration information is determined by the terminal device according to the configuration information from the network device, and the target transmission resource in the second configuration information is determined by the terminal device according to the indication information from another terminal device or is autonomously selected by the terminal device, the terminal device may preferentially send the first sidelink transmission channel, that is, the terminal device sends the first sidelink transmission channel on the target transmission resource.

For another example, if the target transmission resource in the first configuration information is determined by the terminal device according to the indication information from another terminal device, and the target transmission resource in the second configuration information is autonomously selected by the terminal device, the terminal device may preferentially send the first sidelink transmission channel, that is, the terminal device send the first sidelink transmission channel on the target transmission resource.

According to some embodiments, the priorities of various resource allocation methods may be pre-configured, may be specified by a protocol, or may be configured by a network.

Fourth Embodiment is described below.

The preset rule includes: sending, by the terminal device, the first sidelink transmission channel or the second sidelink transmission channel on the target transmission resource according to a type of the first sidelink transmission channel and a type of the second sidelink transmission channel.

In embodiments of the present disclosure, the type of the first sidelink transmission channel or the second sidelink transmission channel is, for example, any one of the following: PSCCH, PSSCH, PSBCH, and PSFCH. The priority order of the four channels can be set according to actual application, or set according to pre-configuration information, or set according to network configuration information. For example, the priorities of PSCCH and PSSCH can be set as lower than the priorities of PSBCH and PSFCH.

Specifically, if the first sidelink transmission channel is PSBCH or PSFCH, and the second sidelink transmission channel is PSCCH or PSSCH, the terminal device preferentially sends the first sidelink transmission channel, that is, the terminal device sends the first sidelink transmission channel on the target transmission resource.

According to some embodiments, the first sidelink transmission channel or the second sidelink transmission channel may refer to any one of the following types: SLSS, DMRS, CSI-RS, and PT-RS. The SLSS may further include S-PSS and/or S-SSS. Specifically, the priority order of the four reference signals SLSS, DMRS, CSI-RS, and PT-RS can be set according to actual applications, or set according to pre-configuration information, or set according to network configuration information. Correspondingly, the preset rule can include a plurality of situations.

For example, the preset rule may include that: the priority of SLSS is higher than the priorities of other types of reference signals. Specifically, if the first sidelink transmission channel refers to SLSS, and the second sidelink transmission channel refers to DMRS, CSI-RS or PT-RS, the terminal device preferentially sends the first sidelink transmission channel, that is, the terminal device sends the first sidelink transmission channel on the target transmission resource.

For another example, the preset rule may include that: the priority of DMRS is higher than that of CSI-RS and PT-RS. Specifically, if the first sidelink transmission channel refers to DMRS, and the second sidelink transmission channel refers to CSI-RS or PT-RS, the terminal device preferentially sends the first sidelink transmission channel, that is, the terminal device sends the first sidelink transmission channel on the target transmission resource.

According to some embodiments, the priorities of CSI-RS and PT-RS in embodiments of the present disclosure may be set to be equal.

Fifth Embodiment is described below.

The preset rule includes: sending, by the terminal device, the first sidelink transmission channel or the second sidelink transmission channel on the target transmission resource according to a Radio Access Technology (RAT) type of the first sidelink transmission channel and a RAT type of the second sidelink transmission channel.

In embodiments of the present disclosure, the RAT type of the first sidelink transmission channel may be LTE or NR; similarly, the RAT type of the second sidelink transmission channel may be LTE or NR.

It should be understood that the priorities of different RAT types in embodiments of the present disclosure can be set according to actual applications. Considering that LTE-V2X usually transmits basic safety messages, while NR-V2X usually transmits information other than the basic safety messages, such as sensor sharing information, the priority of LTE can be set as higher than that of NR. For example, if the RAT type of the first sidelink transmission channel is LTE, or the first sidelink transmission channel is of the LTE type, and the RAT type of the second sidelink transmission channel is NR, or the second sidelink transmission channel is of the NR type, the terminal device sends the first sidelink transmission channel on the target transmission resource.

It should be understood that the above five embodiments of the preset rules may be used separately and independently, or multiple of the embodiments may be used in combination, or one or more of the embodiments may be used in combination with other methods. For example, when the first embodiment in which the comparison result of the first parameter information and the second parameter information is used for selection is applied, if the comparison result of the two pieces of parameter information is the same, whether the first or second sidelink transmission channel is to be sent on the target transmission resource cannot be determined. Under such condition, another method can be used to judge again, for example, the method in the second embodiment is used to judge again until whether the first or second sidelink transmission channel is to be sent on the target transmission resource cannot be determined. For the sake of brevity, the present disclosure does not list all examples.

In embodiments of the present disclosure, it is assumed that the terminal device needs to send the first sidelink transmission channel to a first terminal device on the target transmission resource and to send the second sidelink transmission channel to a second terminal device on the target transmission resource. Because conflict may occur, the terminal device finally chooses to send the first sidelink transmission channel or the second sidelink transmission channel on the target transmission resource according to the preset rule. Correspondingly, the first terminal device receives the first sidelink transmission channel on the target transmission resource, or the second terminal device receives the second sidelink transmission channel on the target transmission resource. The first terminal device and the second terminal device may be any terminal devices, and the first terminal device and the second terminal device may be the same or different terminal devices, and embodiments of the present disclosure do not impose specific limitations on this.

Therefore, in the sidelink data transmission method according to embodiments of the present disclosure, for the situation where the terminal device needs to send both the first sidelink channel and the second sidelink channel on a certain time domain resource, the terminal device can determine to send the first sidelink channel or the second sidelink channel according to the service attribute of the data to be sent, or the transmission modes, or resource allocation methods, or the channel types, etc., and thus embodiments of the present disclosure can avoid sidelink transmission conflicts and improve the transmission efficiency of the system.

It should be understood that in method 200, the terminal device needs to send the first sidelink transmission channel and the second sidelink transmission channel on the target transmission resource, and thus conflicts are caused; similarly, method 200 is also applicable to the following scenarios: the terminal device determines to send a first uplink channel on the target transmission resource according to third configuration information, and also, the terminal device determines to send the second sidelink transmission channel on the target transmission resource according to the second configuration information. Specifically, for the conflict between the first uplink channel and the second sidelink transmission channel, the first sidelink transmission channel in method 200 can also be replaced with the first uplink channel. Correspondingly, the first configuration information can be replaced with the third configuration information. That is, the conflict between the first uplink channel and the second sidelink transmission channel can also be solved by the method 200, for example, the first embodiment of the above method 200 can be used. For brevity, repeated descriptions are omitted here.

For example, for a situation where the terminal device needs to send the first uplink channel and the second sidelink transmission channel on the target transmission resource, the terminal device can obtain the third parameter information of third data to be sent corresponding to the first uplink channel and the second parameter information of second data to be sent corresponding to the second sidelink transmission channel, and according to the comparison result of the parameter information, the terminal device determines to send the first uplink channel or the second sidelink transmission channel on the target transmission resource.

Similarly to the comparison between the first parameter information and the second parameter information, the third parameter information may be at least one of the following information: priority information, reliability information, latency information, data type information, service type information, QoS information, QCI, 5QI and VQI. For the sake of brevity, repeated descriptions are omitted here.

It should be understood that in the various embodiments of the present disclosure, the sequence numbers of the above-mentioned processes does not mean the order of execution of the processes. The execution order of the processes should be determined by their functions and internal logic, and should not be considered as constituting any limitations on the embodiments of the present disclosure.

In addition, the term "and/or" herein is only an association relationship describing associated objects, which means that there can be three relationships, for example, A and/or B can mean three situations: A alone, B alone, and A and B together. Further, the character "/" means that the associated objects before and after "/" are in an "or" relationship.

The foregoing describes in detail the sidelink data transmission method according to embodiments of the present disclosure with reference to FIGS. 1 to 4, and the following describes the terminal device according to embodiments of the present disclosure with reference to FIGS. 5 to 8.

Figure 5:
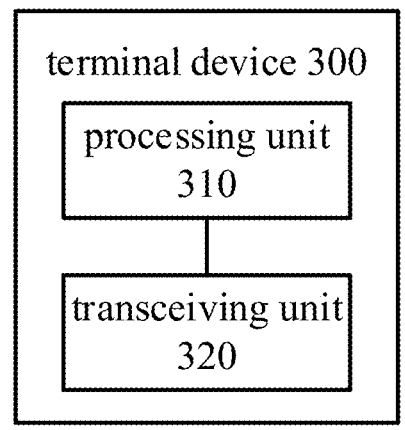
FIG. 5 is a schematic block diagram of a terminal device according to an embodiment of the present disclosure.

As shown in FIG. 5, the terminal device 300 according to an embodiment of the present disclosure includes a processing unit 310 and a transceiving unit 320.

The transceiving unit 320 is configured to, in a case where the processing unit 310 determines to send a first sidelink transmission channel on a target transmission resource according to first configuration information, and determines to send a second sidelink transmission channel on the target transmission resource according to second configuration information, send the first sidelink transmission channel or the second sidelink transmission channel on the target transmission resource according to a preset rule.

According to an embodiment, the target transmission resource is a time domain resource.

According to an embodiment, the preset rule includes, according to a comparison result between first parameter information of first data to be sent on the first sidelink transmission channel and second parameter information of second data to be sent on the second sidelink transmission channel, sending, by the transceiving unit 320, the first sidelink transmission channel or the second sidelink transmission channel on the target transmission resource.

According to an embodiment, the first parameter information is priority information of the first data to be sent, and the second parameter information is priority information of the second data to be sent; the transceiving unit 320 is configured to, if a priority of the first data to be sent is higher than a priority of the second data to be sent, send the first sidelink transmission channel on the target transmission resource.

According to an embodiment, the first parameter information is latency information of the first data to be sent, and the second parameter information is latency information of the second data to be sent; the transceiving unit 320 is configured to, if a latency of the first data to be sent is smaller than a latency of the second data to be sent, send the first sidelink transmission channel on the target transmission resource.

According to an embodiment, the first parameter information is reliability information of the first data to be sent, and the second parameter information is reliability information of the second data to be sent; the transceiving unit 320 is configured to, if a reliability of the first data to be sent is greater than a reliability of the second data to be sent, send the first sidelink transmission channel on the target transmission resource.

According to an embodiment, the first parameter information is a type of the first data to be sent, and the second parameter information is a type of the second data to be sent; wherein the type of the first data to be sent is one of the following types: control information, data, feedback information, broadcast information, and measurement information; wherein the type of the second data to be sent is one of the following types: control information, data, feedback information, broadcast information, and measurement information.

According to an embodiment, the preset rule includes at least one of the following rules: if the first data to be sent is the feedback information and the second data to be sent is the control information or the data, sending, by the transceiving unit 320, the first sidelink transmission channel on the target transmission resource; if the first data to be sent is the feedback information and the second data to be sent is the measurement information, sending, by the transceiving unit 320, the first sidelink transmission channel on the target transmission resource; if the first data to be sent is the feedback information and the second data to be sent is the broadcast information, sending, by the transceiving unit 320, the first sidelink transmission channel on the target transmission resource; if the first data to be sent is the broadcast information and the second data to be sent is the control information or the data, sending, by the transceiving unit 320, the first sidelink transmission channel on the target transmission resource; if the first data to be sent is the control information or the data and the second data to be sent is the measurement information, sending, by the transceiving unit 320, the first sidelink transmission channel on the target transmission resource; and if the first data to be sent is the control information and the second data to be sent is the data, sending, by the transceiving unit 320, the first sidelink transmission channel on the target transmission resource.

According to an embodiment, the feedback information includes data state feedback information and/or channel feedback information.

According to an embodiment, the preset rule includes, if the first data to be sent is the data feedback information and the second data to be sent is the channel feedback information, sending, by the transceiving unit 320, the first sidelink transmission channel on the target transmission resource.

According to an embodiment, the data includes initial transmission data and retransmission data.

According to an embodiment, the preset rule includes, if the first data to be sent is the initial transmission data and the second data to be sent is the retransmission data, sending, by the transceiving unit 320, the first sidelink transmission channel on the target transmission resource.

According to an embodiment, the preset rule includes, if the type of the first data to be sent and the type of the second data to be sent are both the feedback information, and a receiving end of the first data to be sent is the same as a receiving end of the second data to be sent, sending, by the transceiving unit 320, a sidelink transmission channel including the first data to be sent and the second data to be sent on the target transmission resource.

According to an embodiment, the first data to be sent is feedback information for the first sidelink data, the first parameter information is priority information of the first sidelink data, the second data to be sent is second sidelink data, and the second parameter information is priority information of the second data, the preset rule includes, if a priority of the first sidelink data is higher than a priority of the second sidelink data, sending, by the transceiving unit 320, the first sidelink transmission channel on the target transmission resource; or, if the priority of the first sidelink data is lower than the priority of the second sidelink data, sending, by the transceiving unit 320, the second sidelink transmission channel on the target transmission resource.

According to an embodiment, the first data to be sent is feedback information for third sidelink data, the first parameter information is parameter information of the third sidelink data, the second data to be sent is feedback information for fourth sidelink data, and the second parameter information is parameter information of the fourth sidelink data.

According to an embodiment, the parameter information of the third sidelink data is priority information, and the parameter information of the fourth sidelink data is priority information; the preset rule includes, if a priority of the third sidelink data is higher than a priority of the fourth sidelink data, sending, by the transceiving unit 320, the first sidelink transmission channel on the target transmission resource.

According to an embodiment, a receiving end of the first data to be sent is different from a receiving end of the second data to be sent.

According to an embodiment, the first parameter information is a service type of the first data to be sent, and the second parameter is a service type of the second data to be sent.

According to an embodiment, the transceiving unit 320 is configured to, if a priority of a logical channel corresponding to the service type of the first data to be sent is higher than a priority of a logical channel corresponding to the service type of the second data to be sent, send the first sidelink transmission channel on the target transmission resource; and/or, if a priority of a transmission configuration file corresponding to the service type of the first data to be sent is higher than a priority of a transmission configuration file corresponding to the service type of the second data to be sent, send the first sidelink transmission channel on the target transmission resource.

According to an embodiment, the first parameter information is at least one of the following information of the first data to be sent: minimum transmission distance information, minimum communication distance information, QoS information, QCI information, 5QI, and VQI; and/or, wherein the second parameter information is at least one of the following information of the second data to be sent: minimum transmission distance information, minimum communication distance information, QoS information, QCI, 5QI, and VQI.

According to an embodiment, the preset rule includes, if a priority of a transmission type of the first sidelink transmission channel is higher than a priority of a transmission type of the second sidelink transmission channel, sending, by the transceiving unit 320, the first sidelink transmission channel on the target transmission resource.

According to an embodiment, the transmission type of the first sidelink transmission channel is unicast transmission, groupcast transmission, or broadcast transmission; the transmission type of the second sidelink transmission channel is unicast transmission, groupcast transmission or broadcast transmission.

According to an embodiment, a priority of the unicast transmission and a priority of the groupcast transmission are both higher than a priority of the broadcast transmission.

According to an embodiment, the priority of the unicast transmission is higher or lower than the priority of the groupcast transmission.

According to an embodiment, the preset rule includes sending, by the transceiving unit, the first sidelink transmission channel or the second sidelink transmission channel on the target transmission resource according to a method for determining the target transmission resource in the first configuration information and the second configuration information.

According to an embodiment, the method for determining the target transmission resource includes at least one of the following: determining the target transmission resource according to configuration information from a network device, determining the target transmission resource according to indication information from another terminal device, and the terminal device autonomously determining the target transmission resource.

According to an embodiment, the transceiving unit 320 is configured to, if the target transmission resource in the first configuration information is determined according to the configuration information from the network device, and the target transmission resource in the second configuration information is determined according to the indication information from another terminal device or is autonomously selected by the terminal device, send the first sidelink transmission channel on the target transmission resource; or if the target transmission resource in the first configuration information is determined according to the indication information from another terminal device, and the target transmission resource in the second configuration information is autonomously selected by the terminal device, send the first sidelink transmission channel on the target transmission resource.

According to an embodiment, the preset rule includes sending, by the transceiving unit 320, the first sidelink transmission channel or the second sidelink transmission channel on the target transmission resource according to a type of the first sidelink transmission channel and a type of the second sidelink transmission channel.

According to an embodiment, the type of the first sidelink transmission channel is any one of the following types: PSCCH, PSSCH, PSBCH, PSFCH, SLSS, DMRS, CSI-RS, and PT-RS; and/or, the type of the second sidelink transmission channel is any one of the following types: PSCCH, PSSCH, PSBCH, PSFCH, SLSS, DMRS, CSI-RS, and PT-RS.

According to an embodiment, the preset rule includes at least one of the following rules: if the first sidelink transmission channel is PSBCH or PSFCH and the second sidelink transmission channel is PSCCH or PSSCH, sending, by the transceiving unit 320, the first sidelink transmission channel on the target transmission resource; if the first sidelink transmission channel is SLSS and the second sidelink transmission channel is DMRS, CSI-RS or PT-RS, sending, by the transceiving unit 320, the first sidelink transmission on the target transmission resource channel; and if the first sidelink transmission channel is DMRS and the second sidelink transmission channel is CSI-RS or PT-RS, sending, by the transceiving unit 320, the first sidelink transmission channel on the target transmission resource.

According to an embodiment, the preset rule includes sending, by the transceiving unit, the first sidelink transmission channel or the second sidelink transmission channel on the target transmission resource according to a Radio Access Technology (RAT) type of the first sidelink transmission channel and a RAT type of the second sidelink transmission channel.

According to an embodiment, the RAT type of the first sidelink transmission channel is Long Term Evolution (LTE) or New Radio (NR); and/or the RAT type of the second sidelink transmission channel is LTE or NR.

According to an embodiment, the transceiving unit 320 is configured to, if the RAT type of the first sidelink transmission channel is LTE and the RAT type of the second sidelink transmission channel is NR, send the first sidelink transmission channel on the target transmission resource.

It should be understood that the terminal device 300 according to embodiments of the present disclosure may be configured to perform the method 200 in embodiments of the present disclosure, and the foregoing and other operations and/or functions of the various units in the terminal device 300 are configured to implement corresponding processes of the terminal device in each method shown in FIG. 1 to FIG. 4. For brevity, repeated descriptions are omitted here.

Therefore, in the terminal device according to embodiments of the present disclosure, for the situation where the terminal device needs to send both the first sidelink channel and the second sidelink channel on a certain time domain resource, the terminal device can determine to send the first sidelink channel or the second sidelink channel according to the service attribute of the data to be sent, or the transmission modes, or resource allocation methods, or the channel types, etc., and thus embodiments of the present disclosure can avoid sidelink transmission conflicts and improve the transmission efficiency of the system.

Figure 6:
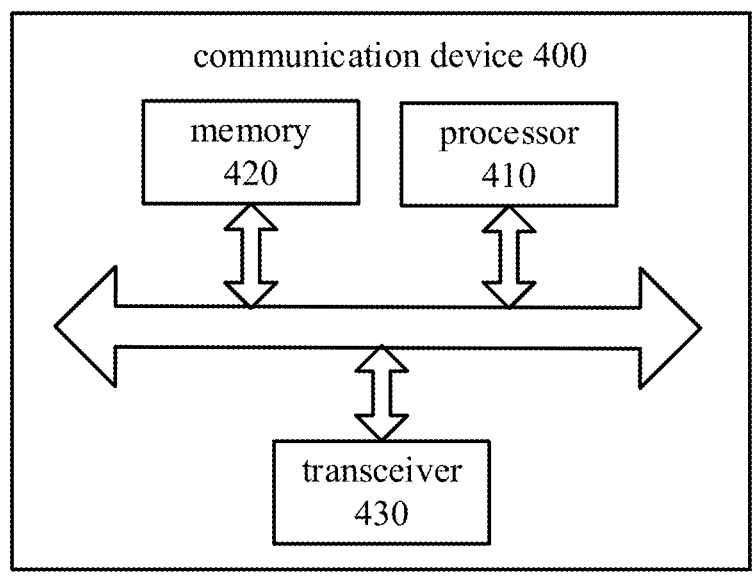
FIG. 6 is a schematic block diagram of a communication device according to an embodiment of the present disclosure.

FIG. 6 is a schematic structural diagram of a communication device 400 according to an embodiment of the present disclosure. The communication device 400 shown in FIG. 6 includes a processor 410, and the processor 410 may call and run a computer program from a memory to perform the method in embodiments of the present disclosure.

According to embodiments, as shown in FIG. 6, the communication device 400 may further include a memory 420. The processor 410 may call and run a computer program from the memory 420 to perform the method in embodiments of the present disclosure.

The memory 420 may be a separate device independent of the processor 410, or may be integrated in the processor 410.

According to embodiments, as shown in FIG. 6, the communication device 400 may further include a transceiver 430, and the processor 410 may control the transceiver 430 to communicate with other devices. Specifically, the transceiver may send information or data to other devices, or receive information or data sent by other devices.

The transceiver 430 may include a transmitter and a receiver. The transceiver 430 may further include one or more antennas.

According to embodiments, the communication device 400 may specifically be the network device according to an embodiment of the present disclosure, and the communication device 400 may implement the corresponding processes implemented by the network device in the method embodiments of the present disclosure. For brevity, details are not repeated here.

According to embodiments, the communication device 400 may specifically be the mobile terminal/terminal device in embodiments of the present disclosure, and the communication device 400 may implement the corresponding processes implemented by the mobile terminal/terminal device in the method embodiments of the present disclosure. For brevity, details are not repeated here.

Figure 7:
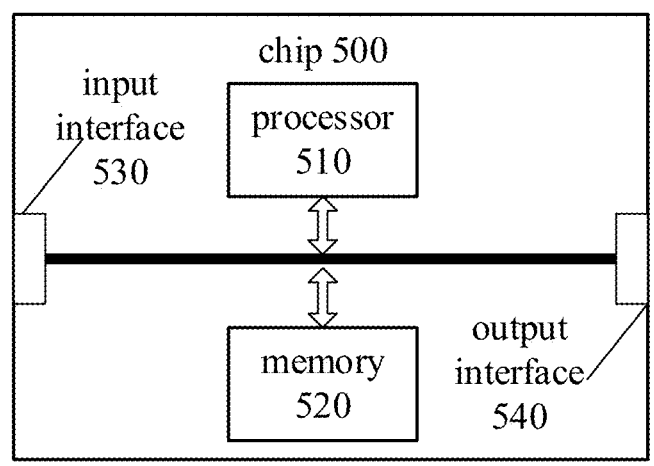
FIG. 7 is a schematic block diagram of a chip according to an embodiment of the present disclosure.

FIG. 7 is a schematic structural diagram of a chip according to an embodiment of the present disclosure. The chip 500 shown in FIG. 7 includes a processor 510, and the processor 510 can call and run a computer program from a memory to implement the method according to embodiments of the present disclosure.

According to embodiments, as shown in FIG. 7, the chip 500 may further include a memory 520. The processor 510 may call and run a computer program from the memory 520 to implement the method according to embodiments of the present disclosure.

The memory 520 may be a separate device independent of the processor 510, or may be integrated in the processor 510.

According to embodiments, the chip 500 may further include an input interface 530. The processor 510 may control the input interface 530 to communicate with other devices or chips, and specifically, the processor 510 can control the input interface to obtain information or data sent by other devices or chips.

According to embodiments, the chip 500 may further include an output interface 540. The processor 510 can control the output interface 540 to communicate with other devices or chips, and specifically, the processor 510 can control the output interface 540 to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the chip can be applied to the mobile terminal/terminal device in embodiments of the present disclosure, and the chip can implement the corresponding processes implemented by the mobile terminal/terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 8:
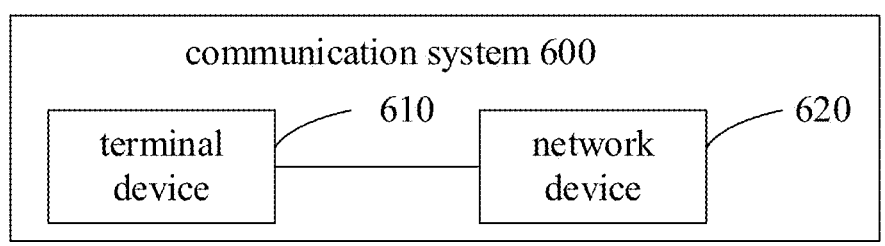
FIG. 8 is a schematic block diagram of a communication system according to an embodiment of the present disclosure.

FIG. 8 is a schematic block diagram of a communication system 600 according to an embodiment of the present disclosure. As shown in FIG. 8, the communication system 600 includes a terminal device 610 and a network device 620.

The terminal device 610 can be used to implement the corresponding functions implemented by the terminal device in the above methods, and the network device 620 can be used to implement the corresponding functions implemented by the network device in the above methods. For brevity, repeated descriptions are omitted here.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for sidelink data transmission, comprising:
obtaining, by a terminal device, first configuration information, wherein the first configuration information is used to indicate to transmit a first sidelink transmission channel on a target transmission resource;
obtaining, by the terminal device, second configuration information, wherein the second configuration information is used to transmit a second sidelink transmission channel on the target transmission resource; and
sending, by the terminal device, the first sidelink transmission channel or the second sidelink transmission channel on the target transmission resource according to a preset rule,
wherein the preset rule comprises:
according to a comparison result between first parameter information of first data to be sent on the first sidelink transmission channel and second parameter information of second data to be sent on the second sidelink transmission channel, sending, by the terminal device, the first sidelink transmission channel or the second sidelink transmission channel on the target transmission resource, wherein the first parameter information is priority information of the first data to be sent, and the second parameter information is priority information of the second data to be sent; and
if a priority of the first data to be sent is higher than a priority of the second data to be sent, sending, by the terminal device, the first sidelink transmission channel on the target transmission resource; and
wherein the first data to be sent is feedback information for first sidelink data, the first parameter information is priority information of the first sidelink data, the second data to be sent is second sidelink data, and the second parameter information is priority information of the second data,
wherein the preset rule comprises:
if a priority of the first sidelink data is higher than a priority of the second sidelink data, sending, by the terminal device, the first sidelink transmission channel on the target transmission resource; or,
if the priority of the first sidelink data is lower than the priority of the second sidelink data, sending, by the terminal device, the second sidelink transmission channel on the target transmission resource,
wherein the first sidelink data and the second sidelink data are carried on a same type of channel.

2. The method according to claim 1, wherein the target transmission resource is a time domain resource.

3. The method according to claim 1, wherein the first parameter information is latency information of the first data to be sent, and the second parameter information is latency information of the second data to be sent,
wherein according to the comparison result between first parameter information of first data to be sent on the first sidelink transmission channel and second parameter information of second data to be sent on the second sidelink transmission channel, sending, by the terminal device, the first sidelink transmission channel or the second sidelink transmission channel on the target transmission resource, comprises:
if a latency of the first data to be sent is smaller than a latency of the second data to be sent, sending, by the terminal device, the first sidelink transmission channel on the target transmission resource.

4. The method according to claim 1, wherein the first parameter information is reliability information of the first data to be sent, and the second parameter information is reliability information of the second data to be sent, wherein according to the comparison result between first parameter information of first data to be sent on the first sidelink transmission channel and second parameter information of second data to be sent on the second sidelink transmission channel, sending, by the terminal device, the first sidelink transmission channel or the second sidelink transmission channel on the target transmission resource, comprises:

if a reliability of the first data to be sent is greater than a reliability of the second data to be sent, sending, by the terminal device, the first sidelink transmission channel on the target transmission resource.

5. The method according to claim 1, wherein the first parameter information is a type of the first data to be sent, and the second parameter information is a type of the second data to be sent, wherein the type of the first data to be sent is one of the following types: control information, data, feedback information, broadcast information, and measurement information, wherein the type of the second data to be sent is one of the following types: control information, data, feedback information, broadcast information, and measurement information.

6. The method according to claim 1, wherein the preset rule comprises:

if a priority of a transmission type of the first sidelink transmission channel is higher than a priority of a transmission type of the second sidelink transmission channel, sending, by the terminal device, the first sidelink transmission channel on the target transmission resource.

7. The method according to claim 1, wherein the preset rule comprises:

sending, by the terminal device, the first sidelink transmission channel or the second sidelink transmission channel on the target transmission resource according to a method for determining the target transmission resource in the first configuration information and the second configuration information.

8. The method according to claim 1, wherein the preset rule comprises:

sending, by the terminal device, the first sidelink transmission channel or the second sidelink transmission channel on the target transmission resource according to a type of the first sidelink transmission channel and a type of the second sidelink transmission channel.

9. The method according to claim 1, wherein the preset rule comprises:

sending, by the terminal device, the first sidelink transmission channel or the second sidelink transmission channel on the target transmission resource according to a Radio Access Technology (RAT) type of the first sidelink transmission channel and a RAT type of the second sidelink transmission channel.

10. A terminal device, comprising:
a memory for storing computer programs;
a transceiver; and
a processor,
wherein the processor is configured to execute the computer programs to:
obtain first configuration information, wherein the first configuration information is used to indicate to transmit a first sidelink transmission channel on a target transmission resource; and
obtain second configuration information, wherein the second configuration information is used to transmit a second sidelink transmission channel on the target transmission resource, wherein the processor is configured to execute the computer programs to control the transceiver to send the first sidelink transmission channel or the second sidelink transmission channel on the target transmission resource according to a preset rule, wherein the preset rule comprises:
according to a comparison result between first parameter information of first data to be sent on the first sidelink transmission channel and second parameter information of second data to be sent on the second sidelink transmission channel, sending, by the transceiver, the first sidelink transmission channel or the second sidelink transmission channel on the target transmission resource, wherein the first parameter information is priority information of the first data to be sent, and the second parameter information is priority information of the second data to be sent; and
if a priority of the first data to be sent is higher than a priority of the second data to be sent, send the first sidelink transmission channel on the target transmission resource; and wherein the first data to be sent is feedback information for first sidelink data, the first parameter information is priority information of the first sidelink data, the second data to be sent is second sidelink data, and the second parameter information is priority information of the second data, wherein the preset rule comprises:
if a priority of the first sidelink data is higher than a priority of the second sidelink data, sending, by the transceiver, the first sidelink transmission channel on the target transmission resource; or,
if the priority of the first sidelink data is lower than the priority of the second sidelink data, sending, by the transceiver, the second sidelink transmission channel on the target transmission resource,
wherein the first sidelink data and the second sidelink data are carried on a same type of channel.

11. The terminal device according to claim 10, wherein the target transmission resource is a time domain resource.

12. The terminal device according to claim 10, wherein the first parameter information is latency information of the first data to be sent, and the second parameter information is latency information of the second data to be sent, wherein the processor is configured to execute the computer programs to control the transceiver to:
if a latency of the first data to be sent is smaller than a latency of the second data to be sent, send the first sidelink transmission channel on the target transmission resource.

13. The terminal device according to claim 10, wherein the first parameter information is reliability information of the first data to be sent, and the second parameter information is reliability information of the second data to be sent, wherein the processor is configured to execute the computer programs to control the transceiver to:
if a reliability of the first data to be sent is greater than a reliability of the second data to be sent, send the first sidelink transmission channel on the target transmission resource.

14. A non-transitory computer-readable storage medium configured to store a computer program, wherein the computer program is configured to cause a computer to perform a sidelink data transmission method comprising:

obtaining, by a terminal device, first configuration information, wherein the first configuration information is used to indicate to transmit a first sidelink transmission channel on a target transmission resource;

obtaining, by the terminal device, second configuration information, wherein the second configuration information is used to transmit a second sidelink transmission channel on the target transmission resource; and sending, by the terminal device, the first sidelink transmission channel or the second sidelink transmission channel on the target transmission resource according to a preset rule, wherein the preset rule comprises:

according to a comparison result between first parameter information of first data to be sent on the first sidelink transmission channel and second parameter information of second data to be sent on the second sidelink transmission channel, sending, by the terminal device, the first sidelink transmission channel or the second sidelink transmission channel on the target transmission resource, wherein the first parameter information is priority information of the first data to be sent, and the second parameter information is priority information of the second data to be sent; and if a priority of the first data to be sent is higher than a priority of the second data to be sent, sending, by the terminal device, the first sidelink transmission channel on the target transmission resource; and wherein the first data to be sent is feedback information for first sidelink data, the first parameter information is priority information of the first sidelink data, the second data to be sent is second sidelink data, and the second parameter information is priority information of the second data, wherein the preset rule comprises:

if a priority of the first sidelink data is higher than a priority of the second sidelink data, sending, by a transceiver, the first sidelink transmission channel on the target transmission resource; or, if the priority of the first sidelink data is lower than the priority of the second sidelink data, sending, by the transceiver, the second sidelink transmission channel on the target transmission resource, wherein the first sidelink data and the second sidelink data are carried on a same type of channel.

\* \* \* \* \*